2,975,098

DIETHYL DITHIOLISOPHTHALATE PHARMACEUTICAL COMPOSITIONS

George William Driver and Norman Senior, Manchester, England, assignors to Imperial Chemical Industries Limited, London, England, a corporation of Great Britain No Drawing. Filed June 4, 1957, Ser. No. 663,336

Claims priority, application Great Britain June 15, 1956

13 Claims. (Cl. 167—58)

This invention relates to new pharmaceutical compositions and more particularly it relates to ointments, creams and pastes possessing antimycobacterial activity and suitable for application to the skin.

We have found that particular solid formulations, such as formulations in the form of creams, ointments or pastes containing certain thiol esters as active ingredients, are suitable for administration by infrication into the skin. When so administered, the active ingredient is absorbed through the skin and thereby exerts its antimycobacterial action. This action may, for example, be an antituberculosis action.

Thus according to the invention we provide new pharmaceutical compositions which are ointments, creams or pastes wherein the active ingredient is a compound of the formula:

$$R\text{—COSEt}$$

wherein R stands for an ethylthio radical or for a phenyl radical which may optionally be substituted by an ethylthiocarbonyl radical.

Suitable compounds of the above stated formula may be for example diethyl dithiocarbonate, ethyl thiolbenzoate, diethyl dithiolphthalate, diethyl dithiolisophthalate and diethyl dithiolterephthalate and of these, diethyl dithiolisophthalate is preferred.

It is to be understood that the said ointments, creams and pastes are suitable for administration by direct application to the skin and when so administered, the active ingredient is absorbed in a sufficient amount to be able to exert its required systemic effect. The selection of suitable pharmaceutical excipients is therefore dependent upon the physical properties of the active ingredient which may be in the form of a solid or a liquid.

Solid active ingredients typically diethyl dithiolterephthalate may be dispersed in ointment bases or in emulsified bases known as creams. We prefer to use those bases which are known to promote the absorption of medicaments through normal skin. Examples of suitable substances capable of being absorbed through the skin are: animal or vegetable fats and oils, including castor oil, arachis oil, coconut oil or lanolin; derivatives of these fats and oils such as the corresponding higher aliphatic and olefinic acids typified by stearic acid, palmitic acid or oleic acid; and the related alcohols, such as cetyl alcohol, stearyl alcohol, cetostearyl alcohol and wool alcohols.

The emulsified bases or creams which may be used for incorporation of the active ingredient are oil-in-water or water-in-oil type emulsions of the above materials optionally containing other excipients suitable for the provision of stable emulsions of the requisite physical form. Any type of emulsifying agent known to the art may be used provided that it does not promote decomposition of the active ingredient or delay absorption of the active ingredient through the skin. As suitable emulsifying agents there may be mentioned (a) salts of fatty acids, such as the salts of stearic acid with sodium hydroxide, triethanolamine or other alkali metal bases or organic bases; (b) combinations of such fatty alcohols as cetyl alcohol, stearyl alcohol and cetostearyl alcohol with cetrimide or other long chain quaternary ammonium salts or mixtures thereof; (c) combinations of these fatty alcohols with sulphated fatty alcohols or their salts such as dodecyl sulphate, sodium dodecyl sulphate and triethanolamine dodecyl sulphate; or (d) polyoxyethylene ethers of fatty alcohols or polyoxyethylene esters of fatty acids. Cetrimide consists essentially of hexadecyltrimethylammonium bromide with small amounts of analogous alkyltrimethyl-ammonium bromides.

The compositions may contain additional excipients such as thickening agents especially in the formulation of ointment compositions. Suitable thickening agents may be higher paraffinic hydrocarbons for example soft paraffin and spermaceti and beeswax.

Liquid active ingredients such as diethyl dithiocarbonate, ethyl thiolbenzoate and diethyl dithiolisophthalate may be incorporated into the above described ointment bases or the emulsified bases for example creams. Alternatively and advantageously, the said liquid active ingredients may be formulated as paste compositions containing a high proportion of the liquid active ingredient said compositions consisting of a simple mixture or paste of the active ingredient with inert, insoluble, organic or inorganic powders which are known to be innocuous and acceptable for application to the skin. Suitable organic powders may be carbohydrate material, e.g., starches, and higher aliphatic and olefinic acids such as stearic acid and oleic acid in the form of their metallic salts, typically their calcium, magnesium and aluminium salts. Suitable inorganic powders may be mineral substances such as bentonite, fuller's earth, kaolin and metallic oxides, carbonates, silicates and phosphates such as the said oxides and salts of zinc, calcium, magnesium and aluminium.

The preferred compositions are such that for every 100 parts by weight of the said composition there is present between about 10 parts by weight and about 95 parts by weight of the active ingredient. The creams and ointments may contain the active ingredient in a proportion as low as 10% or 20% but it is preferred that the pastes contain a higher proportion for example above about 40% of active ingredient.

Certain of the active ingredients have an objectionable odour which may be detectable in the prepared compositions. In such circumstances the odour is minimised or masked by the additional incorporation into the composition of deodorising agents, masking agents or perfumes.

The compositions may be manufactured by any process known to be suitable and convenient for the manufacture of such ointments, creams and pastes. Thus for example the ointments may be obtained by stirring and cooling a hot mixture of the suitable excipients with the active ingredient. The creams may be obtained by stirring a hot mixture of the active ingredient and the fatty excipients with hot water or with a hot aqueous solution of an emulsifying agent and thereafter cooling and passing through a homogeniser. The pastes may be obtained by stirring a mixture of the active ingredient and the excipients either at ordinary temperatures or at an elevated temperature provided that the excipients used are readily fusible.

The pharmaceutical compositions with which this invention is concerned may contain additional active ingredients known to be effective in the treatment of tuberculosis. Thus the said compositions may additionally contain isonicotinic acid hydrazide.

The new pharmaceutical compositions of the invention, as stated above, may be used by direct application to the skin. Such compositions possess advantages over previously described formulation in that they are more readily manufactured since the composition need not be sterilised, they are more easily administered and there is absence of local reaction and pain such as is sometimes observed on intramuscular injection. They possess antimycobacterial activity for example, antituberculosis activity when administered through the skin.

The invention is illustrated but not limited by the following examples in which the parts are by weight:

*Example 1*

A mixture of 53 parts of castor oil and 27 parts of cetyl alcohol at 65–70° C. is added with stirring to 20 parts of finely ground diethyl dithiolterephthalate. The mixture is then cooled and there is thus obtained a medicated ointment suitable for application to the skin.

*Example 2*

A mixture of 12 parts of stearic acid and 25 parts of castor oil at 60–65° C. is added to a solution of 1 part of triethanolamine and 52 parts of water at 60–65° C. The mixture so obtained is emulsified and added in portions to 10 parts of finely ground diethyl dithiolterephthalate. There is thus obtained a medicated cream suitable for application to the skin.

*Example 3*

A mixture of 20 parts of arachis oil and 10 parts of stearyl alcohol at 65–70° C. is added with stirring to 70 parts of diethyl dithiolcarbonate at 65–70° C. The mixture is then stirred and cooled and there is thus obtained a medicated ointment suitable for application to the skin.

*Example 4*

A mixture of 20 parts of diethyl dithiolcarbonate, 14 parts of cetostearyl alcohol and 6 parts of arachis oil is added at 60–65° C. to a solution of 2 parts of Cetomacrogol 1000 B.P.C. in 58 parts of water at 60–65° C. The mixture so obtained is emulsified and homogenised and there is thus obtained a medicated cream suitable for application to the skin.

*Example 5*

25 parts of magnesium stearate are added to 75 parts of diethyl dithiolcarbonate and the mixture thus obtained is a medicated paste which is suitable for application to the skin.

*Example 6*

60 parts of starch are added to 40 parts of diethyl dithiolcarbonate and the mixture thus obtained is a medicated paste suitable for application to the skin.

*Example 7*

55 parts of bentonite are added to 45 parts of diethyl dithiolcarbonate and the mixture thus obtained is a medicated paste suitable for application to the skin.

*Example 8*

A mixture of 25 parts of castor oil and 5 parts of beeswax at 65–70° C. is added with stirring to 70 parts of ethyl thiolbenzoate at 65–70° C. The mixture is then cooled and there is thus obtained a medicated ointment suitable for application to the skin.

*Example 9*

A mixture of 25 parts of ethyl thiolbenzoate, 12 parts of cetyl alcohol and 8 parts of coconut oil is added at 60–65° C. to a solution of 0.5 part of cetrimide in 54.5 parts of water at 60–65° C. The mixture so obtained is emulsified and homogenised and there is thus obtained a medicated cream suitable for application to the skin.

*Example 10*

30 part of aluminium monostearate are added to 70 parts of ethyl thiolbenzoate and the mixture thus obtained is a medicated paste suitable for application to the skin.

*Example 11*

A mixture of 25 parts of cetyl alcohol and 15 parts of glyceryl monostearate at 65–70° C. is added with stirring to 60 parts of diethyl dithiolisophthalate at 65–70° C. The mixture is then cooled and there is thus obtained a medicated ointment suitable for application to the skin.

*Example 12*

A mixture of 20 parts of soft paraffin and 20 parts of cetostearyl alcohol at 65–70° C. is added with stirring to 60 parts of diethyl dithiolisophthalate at 65–70° C. The mixture is then cooled and there is thus obtained a medicated ointment suitable for application to the skin.

*Example 13*

A mixture of 7 parts of lanolin, 8 parts of cetyl alcohol, 5 parts of arachis oil and 60 parts of diethyl dithiolisophthalate at 60–65° C. is diluted by slowly stirring in 20 parts of water at 60–65° C. There is thus obtained a medicated cream suitable for application to the skin.

*Example 14*

To a stirred mixture of 15 parts of cetyl alcohol and 65 parts of diethyl dithiolisophthalate at 65–70° C. are added 20 parts of calcium oleate. The mixture is then cooled and there is thus obtained a medicated paste suitable for application to the skin.

*Example 15*

57 parts of starch are added to 43 parts of diethyl dithiolisophthalate and the mixture thus obtained is a medicated paste suitable for application to the skin.

*Example 16*

30 parts of kaolin are added to 70 parts of diethyl dithiolisophthalate and the mixture thus obtained is a medicated paste suitable for application to the skin.

*Example 17*

25 parts of zinc stearate are added to 75 parts of diethyl dithiolisophthalate and the mixture thus obtained is a medicated paste suitable for application to the skin.

*Example 18*

30 parts of magnesium stearate are added to 70 parts of diethyl dithiolisophthalate and the mixture thus obtained is a medicated paste suitable for application to the skin.

*Example 19*

To a mixture of 10 parts of stearic acid and 10 parts of castor oil heated to 70° C. is added 0.75 part of finely powdered isonicotinic acid hydrazide. The mixture is stirred and heated for 10 minutes at 70° C. and then 25 parts of diethyldithiolisophthalate are added and heating and stirring are continued until a uniform mixture is obtained. This mixture is then added with rapid stirring to a solution of 1 part of triethanolamine in 53.25 parts of water at 70° C. and the resulting emulsion is cooled and homogenised. There is thus obtained a medicated ointment suitable for application to the skin.

*Example 20*

To a mixture of 46 parts of castor oil and 3 parts of stearic acid at 70° C. is added 1 part of finely powdered isonicotinic acid hydrazide. The mixture is then stirred and heated for 10 minutes at 70° C. and then 25 parts of diethyl dithiolisophthalate are added and heating and stirring are continued until a uniform mixture is obtained. The mixture is then cooled and 25 parts of magnesium stearate are added with stirring. There is thus obtained a medicated ointment suitable for application to the skin.

The present application is a continuation-in-part of Serial No. 435,048, filed June 7, 1954 (now abandoned), and Serial No. 469,057, filed November 15, 1954, now U.S. Patent No. 2,826,600, issued March 11, 1958.

What we claim is:

1. A semi-solid pharmaceutical composition in a form suitable for administration by infrication through the skin, said composition comprising as the active ingredient, an effective amount of diethyldithiolisophthalate dispersed in an ointment base comprising a member of the group consisting of animal and vegetable fats and oils capable of being absorbed through the skin.

2. A composition as claimed in claim 1 wherein said base is selected from the group consisting of castor oil, arachis oil, coconut oil, lanolin, stearic acid, palmitic acid, oleic acid, cetyl alcohol, stearyl alcohol, cetostearyl alcohol and wool alcohols.

3. A semi-solid pharmaceutical composition in a form suitable for administration by infrication through the skin, said composition comprising as the active ingredient, an effective amount of diethyldithiolisophthalate dispersed in an emulsified base.

4. A composition as claimed in claim 3 wherein said base is selected from the group consisting of oil-in-water emulsions and water-in-oil emulsions including an emulsifying agent selected from the group consisting of salts of stearic acid with alkali metal bases, and salts of stearic acid with triethanolamine.

5. A composition as claimed in claim 1 including a thickening agent comprising a higher paraffinic hydrocarbon selected from the group consisting of soft paraffin, spermaceti and beeswax.

6. A semi-solid pharmaceutical composition in a form suitable for administration by infrication through the skin, said composition comprising as the active ingredient, an effective amount of diethyldithiolisophthalate and a powder selected from the group consisting of starches and stearic and oleic acids in the form of their metallic salts.

7. A semi-solid pharmaceutical composition in a form suitable for administration by infrication through the skin, said composition comprising as the active ingredient, an effective amount of diethyldithiolisophthalate and a powder selected from the group consisting of bentonite, fuller's earth, kaolin, metallic oxides, carbonates, silicates and phosphates.

8. A pharmaceutical composition in a form suitable for administration by infrication through the skin, said composition comprising, as the active ingredient, diethyldithiolisophthalate and a pharmaceutical carrier therefor rendering said composition applicable to the skin wherein for every 100 parts by weight of the said composition there is present between about 10 parts by weight and about 95 parts by weight of the active ingredient.

9. A composition as claimed in claim 6 wherein for every 100 parts by weight of the said composition there is present between about 40 parts and about 95 parts by weight of the active ingredient.

10. A medicated paste suitable for application to the skin and consisting essentially of 25% by weight of zinc stearate and 75% by weight of diethyl dithiolisophthalate.

11. A medicated paste suitable for application to the skin and consisting essentially of 30% by weight of magnesium stearate and 70% by weight of diethyl dithiolisophthalate.

12. A method for the systemic treatment of disease caused by mycobacterial infections which comprises administering by infrication into the skin an effective amount of diethyldithiolisophthalate.

13. A composition as claimed in claim 3 including an emulsifying agent comprising a mixture of (1) at least one member of the group consisting of cetyl alcohol, stearyl alcohol and cetostearyl alcohol; (2) a member of the group consisting of hexadecyltrimethyl ammonium bromide, dodecyl sulphate, alkali metal salts of dodecyl sulphate and the triethanolamine salt of dodecyl sulphate.

References Cited in the file of this patent

UNITED STATES PATENTS 2,596,069 Fox _____ May 6, 1952

FOREIGN PATENTS 1,107,521 France _____ Aug. 10, 1955

OTHER REFERENCES

Naguib: Lancet, vol. 270, April 14, 1956, pp. 411–412.
Luckenbach: Ber. Deut. Germ., vol. 17, p. 1435 (1884).
Chakravarti et al.: Chem. Abst., vol. 21, p. 3192 (1927).
Davies et al.: Brit. J. Pharmacology, vol. 11, December 1956, pp. 351–356.
Frazer: Formulary for External Therapy of the Skin, Chas. Thomas Publ., Springfield, Ill., 1954, pp. 38–46.
Kushner et al.: J. A. Chem. S., vol. 77, No. 5, March 5, 1955, pp. 1152–1155.
Merck Manual of Diagnosis and Therapy, 1950, pp. 1334–1336, 1398.